United States Patent [19]
Behl et al.

[11] Patent Number: 5,645,635
[45] Date of Patent: Jul. 8, 1997

[54] DELAMINATED KAOLIN PIGMENTS, THEIR PREPARATION AND USE IN PAPER FILLING APPLICATIONS

[75] Inventors: Sanjay Behl, Macon, Ga.; Saad Nemeh, West Long Branch, N.J.; Mitchell J. Willis, Macon, Ga.; Joseph P. Berberich, Barnegat, N.J.

[73] Assignee: Engelhard Corporation, Iselin, N.J.

[21] Appl. No.: 535,416

[22] Filed: Sep. 28, 1995

Related U.S. Application Data

[63] Continuation-in-part of Ser. No. 384,973, Feb. 7, 1995, abandoned.
[51] Int. Cl.$^6$ .................................................. C04B 14/10
[52] U.S. Cl. ............................................ 106/416; 106/486
[58] Field of Search .................................. 106/486, 416, 106/484, 485; 501/144, 145, 146; 162/181.8

[56] References Cited

U.S. PATENT DOCUMENTS

| | | | |
|---|---|---|---|
| 3,171,718 | 3/1965 | Gunn et al. | 23/110 |
| 4,943,324 | 7/1990 | Bundy et al. | 106/486 |
| 4,948,664 | 8/1990 | Brociner | 428/331 |
| 5,085,707 | 2/1992 | Bundy et al. | 106/486 |
| 5,169,443 | 12/1992 | Willis et al. | 106/486 |
| 5,371,051 | 12/1994 | Pope et al. | 501/145 |

FOREIGN PATENT DOCUMENTS

WO96/24639  8/1996  WIPO .

Primary Examiner—Paul Marcantoni
Attorney, Agent, or Firm—Inez L. Moselle

[57] ABSTRACT

This invention relates to paper filling pigments comprising novel mechanically delaminated kaolin particles having controlled narrow particle size distribution and shape. The pigments provide improved opacification compared to conventional and engineered kaolin particles in fine paper making.

7 Claims, No Drawings

DELAMINATED KAOLIN PIGMENTS, THEIR PREPARATION AND USE IN PAPER FILLING APPLICATIONS

RELATED APPLICATIONS

This is a continuation-in-part of U.S. Ser. No. 08/384,973, filed Feb. 7, 1995, now abandoned.

FIELD OF THE INVENTION

This invention relates to paper filling pigments comprising novel mechanically delaminated kaolin particles having controlled particle size and shape. The pigments provide improved opacification compared to conventional kaolin particles in fine paper making.

BACKGROUND

It is well known that the particle size of pigments used by the paper industry has a great effect on functional properties. It has long been recognized that in cases of kaolin clay filling pigments, the greater the amount of particles finer than 2 micrometers (e.s.d.) in the clay, the less opaque is the sheet. This has been explained by the fact that the kaolin particles finer than 2 micrometers have a different morphology from the particles greater than 2 micrometers. The 2 micrometers particle size is the approximate cutoff point below which the kaolinite particles in a naturally occurring kaolin may exist as thin individual crystalline plates. Above this cutoff point the kaolinite particles exist as bonded stacked aggregates of platelet (so called "stacks" or "booklets") or, in some cases, long, wormlike assemblies of platelet, which make the kaolin more bulky, thus leading to better opacifying power.

Conventional kaolin clays crudes used as a sources of pigment grades of kaolin usually contain about 40% to 60% by weight of particles finer than 2 micrometers after removal of grit and coarse impurities. The kaolin portion of the crude is polydispersed in the sense that the particles occur over a range of sizes and shapes. Thus, a kaolin crude will not contain particles of a single size, such as, for example, particles all of which are 2 micrometers. Typically, a degritted kaolin crude will contain particles ranging in size from sub-micron (or colloidal) to particles that are 20 micrometers or larger. Such degritted clays are too coarse to be used in fine paper making. Conventional practice is to remove a preselected portion of plus 2 micrometers from the finer clay particles. This is accomplished by forming the crude clay into a dispersed aqueous pulp, removing the gross impurities by means such as screening, and then hydraulically fractionating the clay to remove a desired proportion of clay particles larger than 2 micrometers. The fractionation is usually carried out by using centrifuges in commercial operations. The product from the centrifuge is a suspension having a higher percentage of finer particles than the starting clay. After bleaching (and possibly other beneficiation), the fine fraction may be sold as a paper coating pigment. When the centrifugation is registered trademark "NOKARB", are used to a limited extent as fillers. Frequently a portion of, or even the entire, coarse fraction is discarded because of the limited demand for such clays.

In recent years, some of the coarse particle size fractions of kaolin crudes have been used as feed material in the production of mechanically delaminated kaolin pigments. It has long been recognized in the industrial minerals industry that mechanical delamination of kaolin stacks present in the coarse particle size fraction of many kaolin crudes provide kaolin filler products with improved opacification in filling applications. See, for example U.S. Pat. No. 3,171,718, Gunn et al. Commercially available delaminated No. 2 grades used as fillers by the paper industry are supplied commercially under the registered trademarks NUFIL and NUFIL 90.

In practicing delamination, a suspension of a coarse particle size fraction of a kaolin crude is agitated with grinding media such as sand, plastic pellets or glass microballons until the booklets in the feed clay are cleaved and delaminated particles are produced. Similar results may be obtained when a paste of clay is extruded under high pressure ("superstrusion"). After the kaolinite booklets are delaminated, a suspension of the clay may be fractionated. A fine size fraction containing the artificially produced platelet with dimensions of 2 micrometers and finer is recovered. The fine size fraction is used as a paper coating pigment.

Particle sizes of kaolin are conventionally determined by sedimentation using Stoke's Law to convert settling rates to particle size distribution, and assume a spherical particle shape for the kaolin particles. Hence, the use of conventional term "equivalent spherical diameter (e.s.d)" to designate particle size. It is well known that the expression of the particle size in terms of equivalent spherical diameter is not accurate in the case of particles having a high aspect ratio such as mechanically delaminated platelets.

It has also been recognized that a relative narrowing of the particle size distribution of mechanically delaminated as well as non-delaminated kaolin particles results in pigments providing improved opacity in filling applications. Such pigments are disclosed as being especially advantageous when used in the manufacture of lightweight coated paper for rotogravure printing (see U.S. Pat. No. 4,948,664, Brociner et al). It is well known to remove ultrafine kaolin particle, e.g., particles finer than about 0.3 micrometers, e.s.d. after delamination. This obviously contributes to the production of a delaminated pigment product having a narrower particle size distribution than it would have if the ultrafines were not removed. U.S. Pat. No. 4,948,664, supra, shows that in cases where very narrow particle size distribution was required, delamination was followed by a coarse fractionation and secondary fine removal steps. Patentees did not remove the primary fines prior to delamination. In illustrative examples, there was a significant amount of secondary fines that were generated during delamination which had to be removed latter. Removal of fines is referred to as "defining" in U.S. Pat. No. 4,943,324 Bundy et al., and U.S. Pat. No. 5,085,707, also Bundy et al. In these patents, at least a portion of slimes is present dduring delamination. Sometimes removal of the fines is termed "desliming".

Typical commercial delaminated kaolin pigments, exemplified by NUCLAY (or NUFIL) kaolin supplied by Engelhard Corporation, are about 80% finer by weight finer than 2 micrometers, e.s.d. Thus, the particle size distribution of such commercial delaminated kaolin as measured by sedimentation is typical of that of No. 2 non-delaminated coating clay. U.S. Pat. No. 5,169,443 Willis et al., commonly assigned, makes reference to certain delaminated kaolins that are about 90% by weight finer than 2 micrometers, thus similar to No. 1 coating clays.

Surface area is a property related to particle size of kaolins although surface area alone does not correlate directly with particle size. Surface area is expressed in terms of square meters of area per gram of a material and is frequently measured by the BET method using nitrogen as adsorbate. MerCury porosimetry is also used to measure surface area.

A No. 1 clay, which typically has a large number of fine particles, has higher surface area than a No. 2 clay, because fine particles have a higher surface area than coarse particles. Use of surface area as a parameter in evaluating delaminated kaolins appears in U.S. Pat. No. 5,169,443, Willis et al., supra.

Filler pigments of the invention are useful in making various grades of paper. However, their outstanding performance is especially noteworthy in filling those grades referred to as "fine" or, alternatively, as "wood free". Fine paper is a general classification referring to white, uncoated printing and writing grades which contain no more than 25% mechanical pulp in the furnish. Most furnishes are wood free. Specific grades are offset; tablet, envelope, bond, ledger, mimeo, duplication and various book stocks. The pulps used to make such grades are chemically treated to achieve higher brightness and strength than papers such as newsprint prepared from ground wood pulp.

Generally, wood-free paper is 20–25 points brighter than ground wood paper. However, because of the higher brightness of the wood free paper, opacity is much lower than ground wood paper.

Fine paper is made in a wide range of basis weight from 36 pounds to 180 pounds/3,300 ft.$^2$, depending on the intended application. Further, uncoated fine paper, such as Xerox® paper, gives a significantly better printablility as compared to paper from ground wood pulp because the sheet is tighter and there is less absorption of ink in the base stock.

Expensive pigments such as calcined kaolin pigments and titania are normally used to increase the opacity of filled sheets of fine papers. Pigments of this invention are used to extend these more expensive pigments, thus reducing pigment cost. In this regard, it is noted that unfilled wood free paper is expensive. Pigments of this invention will replace fiber, thus saving paper mills money in addition to money savings attributed to extension of more expensive pigments such as calcined kaolin and titania.

SUMMARY OF THE INVENTION

One aspect of this invention stems from the discovery that the production of extremely platy kaolin particles devoid of primary and secondary fines is of unexpected benefit. The pigment thus produced results in superior optical properties when applied to a kaolin intended for use as a filler for paper properties in filling applications as compared to results obtained using No. 1, No. 2 and delaminated standard kaolin pigments.

Since the delaminated products of the invention are typically about 85–90% by weight finer than 2 micrometers, they can be classified as No. 1 kaolin clay pigments; however, the surface area is a much lower than that of the conventional No. 1 clays of such particle size. The surface area of delaminated pigment of the invention (7 to 12 m$^2$/g by the BET method) is typically that of a No. 3 kaolin.

Pigments of this invention provide improved opacification in filling applications. Pigments of this invention are particularly useful for fine paper making. The pigments are specifically designed to replace titanium dioxide and (or) calcined clays in wet end applications while maintaining or improving the desired paper properties. The opacifying powers of filler pigments of the invention may also be valuable in coating applications especially in lightweight coating and ultralight weight coatings.

Another aspect of the invention resides in a novel method of producing delaminated kaolin pigments which features a desliming step prior to delamination. The prior art practice has been to deslime after delamination in those cases where a combination of delamination and desliming steps have been applied to kaolin. A major benefit from this processing is that superior delamination rates are achievable when practicing desliming before delamination. This also results in a more uniformly delaminated product, since the fines have a very poor response to mechanical delamination. More specifically, the fines do not respond to delamination because of the lack of presence of "booklets" in these fine size ranges. Removal of primary fines also improves dispersion quality of the slurry prior to delamination. This may further enhance the delamination rate and can also give more controlled delamination. Also, removal of primary fines yield better opacity in fine paper making.

Another feature of the method of this invention resides in limiting generation of secondary fines by controlling the delamination process such that essentially no fines are generated during the process. Thus, delamination is controlled so as to avoid generating enough fines to change significantly the particle size distribution and the surface area of the product. Prior art delamination processes that result in No 1 clays generate substantial amounts of fines. Control of the delamination to minimize excessive fine production is effected by control of the Delamination Index (DI), hereinafter described.

DESCRIPTION OF THE PREFERRED EMBODIMENTS

The novel hydrous kaolin pigments of this invention are adapted for paper filling application and comprise extremely platy kaolin particles with a controlled amount of primary and secondary fines. Primary fines are defined as colloidal particles in the crude with sizes smaller than 0.2 micrometers. The secondary fines are colloidal particles finer than 0.2 micrometers that are a product of a unit operation (such as delamination) capable of producing highly platy particles.

The novel delaminated kaolin pigments have the following characteristics:

Controlled Particle Size Distribution

Greater than or equal to 85% by weight finer than 2 micrometer;

25% by weight finer than 0.5 micrometer, preferably 10% to 25%, most preferably 15% and 25%, finer than 0.5 micrometers;

10% by weight finer than 0.3 micrometer, most preferably 5% to 10% finer than 0.3 micrometers;

5% by weight or less finer than 0.2 micrometer, most preferably 0% finer than 0.2 micrometer;

Average particle size in the range 0.65 to 1.1 micrometers, most preferably 0.7–0.9 micrometers.

Surface Area

BET surface area preferably between 7–12 m$^2$/g, most preferably 9–11 m$^2$/g;

Ratio of the surface area by Mercury porosimetry/BET surface area between 0.6–0.95 and most preferably 0.7–0.95;

Block brightness is preferably between 80–95%, most preferably 88–90.5%.

Platy Nature

Another feature of the pigment is its extremely platy nature, where the platiness is defined in terms of Delamination Index (D.I), which is defined as change in % finer than 2 micrometers during delamination process, i.e.; D.I.=% by weight finer than 2 micrometers in product–% by weight finer than 2 micrometers in feed. D.I. of the pigment is 20–45, with preferably in the range of 25–35 and most preferably about 30.

A starting crude kaolin useful in practicing this invention is known in the art as "soft" kaolin. Such crudes are mined, for example in Central Georgia, and contain particles with booklet morphology. After degritting in conventional manner to remove the oversize grit, the particle size of the kaolin is typically that shown in the accompanying illustrative examples. The "soft" kaolin crudes mined in central Georgia usually contain about 5–25% by weight of particles finer than 0.3 micrometers. The fine particles in such crudes, e.g., the particles finer than 2 micrometers e.s.d., contain very fine booklets or fine individual particles. Removal of these fine particles/booklets (primary slimes) in accordance with the invention followed by delamination (instead of subsequent to) helps to produce particles with desired high aspect ratios and also limits generation of fines during delamination. Since the fines are known to have a poorer response to delamination, removal of these fines helps to increase the rate of delamination. This results in reduced processing costs.

Typically the crude is initially crushed and then blunged in water, preferably containing a clay dispersant, such as, for example, a mixture of soda ash and sodium silicate, or a condensed phosphate salt, e.g., tetrasodium pyrophosphate, sodium polyacrylate or mixtures thereof. Generally, solids of the blunged clay are in the range of 30% to 65%, usually about 40% by weight. The blunged clay is then degritted by known means such as the use of screens or gravity settling to remove oversize (grit). Suitable for this purpose are 200 or 325 mesh (U.S. Standard) screens. The degritted slip of kaolin is then deslimed to remove substantially all of the particles finer than 0.2 micrometers. Continuous high speed centrifuges such as those equipped with nozzle bowls or scrolls can be used, or gravity settling can be employed for desliming. Satisfactory results may be obtained with degritted crude by operating the centrifuge to remove and then isolate a fine size fraction of which about 95% by weight of the particles are finer than 0.5 micrometers and a deslimed fraction which is about 50–65% by weight finer than 2 micrometers. Typical solids of the coarse fraction are higher (typically about 10%) than the feed. Typically, 10–25% of the total material is removed as fines. The coarse size fraction remaining after centrifugation to separate the slimes is used as delaminator feed. When a fine fraction is separated in the first classification step, the population of particles comprising the delaminator feed consists of a higher proportion of large kaolin books and plates than occurs in population of kaolin particles contained within the kaolin slip prior to classification.

It is a feature of this invention to avoid excessive delamination.

The term "excessive" delamination as used herein implies generation of an excessive amounts of fines during the delamination operation. The unit operation is intended to peel a booklet to individual platelet and not fracture, chip or abrade the platelet. During "excessive" delamination the booklets are not only peeled but also fractured.

Data in the patent of Willis et al., supra, indicate that a No. 2 clay was produced that was very coarse as compared to products of the invention. Delamination of a typical No. 3 clay to a No. 1 clay without removal of primary fines would result in excessive delamination. However if a No. 3 clay is delaminated to a standard No. 2 particle size the delamination may not be excessive. A Delamination Index of 20 or greater without removal of primary fines is termed "excessive" delamination. Kaolin particles which have an excessive delamination will have a relatively smaller aspect ratio as compared to other delaminated particles. A good measure of "excessive" delamination is the difference in the Delamination Index at 2 micrometers and 1 micrometer. Excessive delamination occurs when the Delamination Index at 1 micrometer is equal to or larger than that at 2 micrometers.

The process of delaminating the clay can be practiced using fine milling media in a batch operation but is advantageously carried out in a continuous manner. Non-limiting examples of milling media are small ceramic balls, coarse sand, glass beads, plastic cylinders, beads, or pellets of nylon, styrene-divinyl benzene copolymer, polyethylene or other plastic. The media acts upon a suspension of the clay in water.

Most preferably, the milling media is minus 20 plus 50 mesh (U.S. sieve) styrene divinyl benzene copolymer or glass beads. Generally, the volume of beads to clay slurry varies between 20–70%, most preferably between 35% and 50%. The clay feed to the process should typically be controlled between 20% to 50% solids; however, optimum processing conditions are often achieved between 35 and 45% solids.

A suitable vessel used for the process contains vertical baffles and typically has a height to diameter ratio greater than 1.0 and optimally 1.5 to 2.0. Such a vessel is equipped with an agitation system containing multiple agitator elements attached to a vertical shaft. The number and spacing of the agitators must be optimized for the specific process conditions in order to impart the necessary combined shear and percussive and frictional energy input necessary to overcome the Van der Waals forces holding individual platelets in a stacked array. Energy input required for delamination will vary due to differences between crudes, process conditions, and equipment; typically, the processing requires from about 10 to 50 horsepower hour per ton of clay charged to the delaminators.

The slip of delaminated clay is then optionally centrifuged to remove oversize, e.g., particles larger than 2 micrometers, as an underflow and the overflow product which is then passed through a high intensity magnetic separator, followed by bleaching, filtration and drying to produce a product of the invention. The slip prior to delamination may be beneficiated by standard processes such as Ultraflotation and TREP flotation. The centrifuged underflow containing oversize may be blended with appropriate levels of delaminated and/or un-delaminated clay to achieve blends of desired particle size distribution and further processed in a conventional manner, e.g., magnetic purification and for bleaching, to produce other advantageous kaolin products.

The slimed fraction separated from the coarser kaolin prior to delamination may be discarded or processed in a conventional manner, e.g., magnetic purification and/or bleaching, to produce a product with very fine particle size distribution.

It is also within the scope of the invention to delaminate with grinding media other than plastic beads, e.g., by sand, zircon or glass beads or by the delamination process known as "superstrusion". Conventional pre and post processing steps such as flotation, selective flocculation, magnet separation, floc/filtration, bleaching and spray drying may be employed. In downstream processing, a Netzsch mill may be used when it is desirable to produce a product with a particle size of 90% finer than 2 micrometers. Milling in a Netzsch mill involves shearing a suspension of the particles using a particulate media. Glass is preferred in practice. This method is useful in producing fine particles more efficiently as compared to standard delamination. The sample may undergo double delamination. An undesirable feature of double delamination is the problem of controlling the generation of colloidal fines.

Optionally, the product discharged from the delamination/ Netzsch milling may be subjected to high shear milling to improve the high shear viscosity.

Delaminated kaolin pigments of the invention can be advantageously used as the single pigment in filling fine paper. However, it is also within the scope of the invention to employ pigments of the invention in blends with other kaolin and non-kaolin pigments, and to use the blends to fill fine paper.

All particle sizes used in the specifications and claims are determined with the SEDIGRAPH 5100 particle size analyzer and are reported in terms of equivalent spherical diameter (e.s.d) on the weight percentage basis.

In the examples, the following test procedure was used:
Opacity (%)

A measure of a sheet of paper's hiding power. B&L opacity is measured using a light source with a wavelength of 577 nm. The opacity measurement is actually expressed as a percentage: the reflectance of the incident light at a fixed angle with the paper blackened by a black body divided by the reflectance of the incident light when the sheet is backed by a white body. It is measured using Technityne, BNL3 opacimeter.

In the examples, the ratio of the surface areas obtained by BET and Mercury porosimetry were used to characterize the pigments. BET surface area is the area measurement taken by adsorption/desorption of nitrogen molecule on the surface. The equipment used was Nova, N-1000 (Quantachrome). This technique will give the total surface area which is available to the nitrogen molecule to adsorb. See B. D. Adkins, and B. H. Davis, "Comparison of Nitrogen Adsorption and Mercury Penetration Results", Adsorption Science Technology, Vol. 5., p. 76, 1988. Surface area measurement by Mercury porosimetry is carried out by finding the total volume available for mercury to penetrate under pressure. Surface area is subsequently calculated from the intruded volume using an assumption of cylindrical pores. The ratio of the two measurements may be used to characterize the pigments of the invention. Mercury porosimetry was carried out using Autoscan 33 (Quantachrome). If significant amount of fines are not generated during delamination process, the BET surface area of the feed and the product will be similar. This may be explained by the fact that the BET surface area of a booklet is nearly equal to that of the delaminated particles from that particular booklet. In case of a surface area measurement by Mercury porosimetry there would be a more drastic increase in the surface area before and after delamination. This is because when the clay is in a booklet morphology, the intrusion of mercury is limited. If the particles are completely delaminated the surface area as measured by the two techniques should be very similar.

In the examples some standard products were used as the basis of comparison for use as a filler product to achieve high opacity in fine paper making. Properties of other delaminated and deslimed kaolin pigments are included in the examples for further purposes of comparison.

The examples also include the preparation of and show properties of products obtained from feed containing coarse or fine booklets and demonstrate the effects of the presence or absence of primary fines, as well as the and presence of primary or secondary fines, where the secondary fines were generated by unit operations such as delamination or Netzsch milling.

A product made in accordance with the teachings of the patent of Gunn et al. (supra) was also used as a control delaminated pigment. In the Gunn patent (supra), a standard No. 3 clay was delaminated to a No. 1 particle size. These products would have significantly larger surface area as compared to the high print gloss pigments of the invention because the primary or the secondary fines were not removed from the product. It is acknowledged in the art that the fine particles contribute most significantly to surface area.

Typical Coarse white crude found in middle Georgia and used in illustrative examples has the following characteristics:

50–60 wt % finer than 2 micrometer

40–45 wt % finer than 1 micrometer

25–35 wt % finer than 0.5 micrometer

10–20 wt % finer than 0.3 micrometer 10 wt % or less than 0.2 micrometer

Average particle size is in the range of 1.7–1.95 micrometer.

Surface area is less than 17 $m^2/g$ as determined by BET analysis.

The crude typically has a high level of grit, therefore, it is degritted by centrifugation. Typical characteristic of degritted crude are:

55–75 wt % finer than 2 micrometer

45–60 wt % finer than 1 micrometer

25–45 wt % finer than 0.5 micrometer

10–25 wt % finer than 0.3 micrometer 15 wt % or less than 0.2 micrometer

Average particle size in the range of 0.55–0.90 micrometer.

Surface area of less than 18 $m^2/g$ as determined by BET analysis.

In the following examples, delamination was performed in a standard stirred tank delaminator using glass beads at solids content between 20 and 30%. The bead content of the delaminators was 45–50%. Delamination was performed in a batch system for 30 minutes unless otherwise stated. Removal of the primary or the secondary fines ("desliming") was achieved by employing a standard or a disk-nozzle centrifuge. In those examples in which the paper filling studies were performed, the slurry was bleached with a hydrosulfite bleach to meet a brightness specification and flocced with sulfuric acid (target pH 3.5) and alum (at 6 lbs/ton of dry clay) for filtration. Filtration in the following examples was performed using pan filters. The filtercake was washed and re-dispersed using a blend of soda ash and polyacrylate (C-211) as a dispersant. This was followed by spray drying.

In some examples, a Netzsch mill, with glass media at 80% bead volume ("Model 60 Liter Netzsch Mill") was employed to further delaminate the particles. All Netzsch milling operations were performed at high solids content (50–60%). High solids slurry was achieved by floc/filtering the low solids slurry and re-dispersing the filter cake with a dispersant, such as a blend of soda ash/caustic and polyacylate.

EXAMPLE 1A

In this example, a degritted coarse white crude was delaminated to a typical No. 2 clay particle size. The characteristics of the degritted crude and the delaminated sample are given in Table 1. This example is illustrative of the results of a delaminating to produce a No. 2 pigment with both primary and secondary fines. This product was made in accordance with the teaching of Gunn et al. (Supra).

EXAMPLE 1B

The feed of Example 1A was deslimed to remove the primary fines and then delaminated to about 80% finer than 2 micrometers. The delamination was carried out under the same conditions as in Example 1A. The characteristics of the deslimed and the delamination products are given in Table 1. Data in this table show that a higher Delamination Index was obtained by desliming prior to delamination; this translates to a better delamination rate for the same Delamination Index.

EXAMPLE 1C

Example 1B was repeated with a deeper desliming cut. The results of the particle size testing are reported below. The data show that removal of fines clearly helped to increase the Delamination Index.

CHARACTERISTICS OF FEED TO A DELAMINATOR

| Example | Particle size distribution, wt. % at micrometers indicated | | | | | BET Surface Area m²/g | Ratio of Mercury Surface Area/BET Surface Area |
|---|---|---|---|---|---|---|---|
| | 2 | 1 | 0.5 | 0.3 | 0.2 | | |
| 1A | 69 | 56 | 39.4 | 23.5 | 14 | 15.6 | 0.56 |
| 1B | 64.6 | 48.9 | 28.5 | 12.1 | 4.6 | 13.1 | 0.57 |
| 1C | 62.7 | 46.5 | 25.1 | 9.6 | 3.5 | 12.7 | 0.56 |

CHARACTERISTICS OF DELAMINATOR PRODUCT

| Ex | Particle size distribution wt. % at micrometers indicated | | | | | BET Surface Area m²/g | Ratio of Mercury Surface Area/BET Surface Area | Delamination Index |
|---|---|---|---|---|---|---|---|---|
| | 2 | 1 | 0.5 | 0.3 | 0.2 | | | |
| 1A | 82.9 | 67.3 | 44.6 | 24.4 | 12.8 | 16.2 | 0.50 | 13.9 |
| 1B | 79.8 | 61.7 | 35.3 | 15 | 6.3 | 13.9 | 0.65 | 15.2 |
| 1C | 80.5 | 62.3 | 35.8 | 14.6 | 5.9 | 13.5 | 0.68 | 17.8 |

EXAMPLE 2

Control

This example illustrates the production of a No. 1 delaminated pigment without removing primary fines or secondary fines.

The degritted crude had the following characteristics:

60.4 wt % finer than 2 micrometer
46.3 wt % finer than 1 micrometer
27.2 wt % finer than 0.5 micrometer
14.5 wt % finer than 0.3 micrometer
7.4 wt % finer than 0.2 micrometer
Average particle size 1.20 micrometer.

This degritted crude sample was passed through a magnet. It was subsequently flocced with acid-alum, bleached to a GE brightness of 87 and filtered. The filter cake was redispersed using a blend of sodium polyacrylate and soda ash as a dispersant. The solid content of the slurry was 55%. This slurry was milled in a Netzsch Mill to 86.4% finer than 2 micrometer. The characteristics of the product are:

86.4 wt % finer than 2 micrometer
70.6 wt % finer than 1 micrometer
46.8 wt % finer than 0.5 micrometer
26.5 wt % finer than 0.3 micrometer
15.6 wt % finer than 0.2 micrometer
Average particle size 0.54 micrometer.

Surface area of the pigment: 16.1 m²/g as determined by BET analysis.

Surface area of the pigment: 14.2 m²/g as determined by Mercury porosimetry.

The ratio of surface area by Mercury to BET measurement was 0.88.

Delamination Index was 26.4.

This pigment does not meet the particle size distribution of products of this invention.

EXAMPLE 3

ULTRACOTE® 90 kaolin pigment, a standard number 2 non-delaminated kaolin pigment used in filling applications commercially, was evaluated. This product is prepared by removing coarse booklets from degritted soft crude by centrifugation to a particle size of 80% finer than 2 micrometers.

The characteristics of a sample of this product are:

81 wt % finer than 2 micrometer
26 wt % finer than 0.3 micrometer
18 wt % finer than 0.2 micrometer
Average particle size 0.62 micrometer.

Surface area of the pigment: 15.1 m²/g as determined by BET analysis.

Surface area of the pigment: 14.1 m²/g as determined by Mercury porosimetry.

The ratio of surface area by Mercury to BET measurement was 0.93.

Delamination Index of this product was 0.

Brightness of the product is 90.1%.

EXAMPLE 4

This example illustrates the processing of a crude from which the coarse booklets were removed. This was followed by delamination and then removal of the secondary fines. The extent of delamination in this product was minimal.

A standard coarse soft crude was beneficiated by froth flotation, followed by centrifugation to a particle size of about 90 at 2 micrometer and delamination to a particle size of 97% finer than 2 micrometer. A portion of the partial secondary fines were removed from the resulting pigment. The characteristics of the product are 94 wt % finer than 2 micrometer
79 wt % finer than 1 micrometer
40 wt % finer than 0.5 micrometer
13 wt % finer than 0.3 micrometer
4 wt % finer than 0.2 micrometer
Average particle size 0.58 micrometer.

Surface area of the pigment: 14.5 m²/g as determined by BET analysis.

The Delamination Index was 7.

The sample was subsequently bleached to a 90.5 & brightness followed by floccing and filtration. The sample was re-slurried and spray dried.

EXAMPLE 4B

The pigment of Example 4 was deslimed after delamination to remove nearly all the colloidal fines.

The characteristics of the product are:

92.9 wt % finer than 2 micrometer
73.9 wt % finer than 1 micrometer
24.2 wt % finer than 0.5 micrometer
2.9 wt % finer than 0.3 micrometer
0 wt % finer than 0.2 micrometer
Average particle size 0.67 micrometer Surface area of the pigment: 11.6 m²/g as determined by BET analysis. The Delamination Index was 6.

EXAMPLE 5

This example demonstrates the results of processing a soft crude by removing the coarse booklets followed by removal of the primary fines, followed by delamination.

A standard coarse soft crude was centrifuged to a particle size of about 90% at 2 micrometer and from the resulting slurry the fines were removed using a centrifuge. The resulting slurry was delaminated using standard delamination techniques The characteristics of the product are:

95.4 wt % finer than 2 micrometer
81.4 wt % finer than 1 micrometer
47.4 wt % finer than 0.5 micrometer
17.4 wt % finer than 0.3 micrometer
10.4 wt % finer than 0.2 micrometer
Average particle size 0.51 micrometer Surface area of the pigment: 14.3 m²/g as determined by BET analysis.

Surface area of the pigment: 13.3 m²/g as determined by Mercury porosimetry.

The ratio surface area by Mercury to BET measurement was 0.93.

The Delamination Index was 7.

The slurry was treated in a high intensity magnetic separator and bleached to a brightness specification of 89.4%. This was followed by standard processing including filtration, washing and spray drying.

EXAMPLE 5B

The pigment of Example 5 was deslimed after delamination to remove nearly all the colloidal fines. The characteristics of the product are:

90.0 wt % finer than 2 micrometer
67.4 wt % finer than 1 micrometer
15.4 wt % finer than 0.5 micrometer
0 wt % finer than 0.3 micrometer
0 wt % finer than 0.2 micrometer
Average particle size 0.51 micrometer Surface area of the pigment: 10.3 m²/g as determined by BET analysis.

The Delamination Index was 6.

EXAMPLE 6

This example illustrates the processing of a crude by removing primary fines before delamination. In the processing, the delamination resulted in secondary fines. Thus, the product contained secondary fines but not primary fines.

The standard coarse white crude was degritted to about 67% finer than 2 micrometers followed by removal of the primary fines. The resulting material was 60% by weight finer than 2 micrometers and about 5% by weight finer than 0.2 micrometers. This was floated followed by delamination. The characteristics of the product are:

87.3 wt % finer than 2 micrometer
70.3 wt % finer than 1 micrometer
39.7 wt % finer than 0.5 micrometer
17.4 wt % finer than 0.3 micrometer
8.2 wt % finer than 0.2 micrometer
Average particle size 0.66 micrometer The Delamination Index was 27.

This material was bleached to a 90.5% brightness followed by flocculation and filtration. The filter cake was redispersed using a dispersant (blend of C211 and soda ash) and milled in a Netzsch mill to the following particle size:

90.0 wt % finer than 2 micrometer
76.5 wt % finer than 1 micrometer
46.5 wt % finer than 0.5 micrometer
24.5 wt % finer than 0.3 micrometer
14.4 wt % finer than 0.2 micrometer
Average particle size 0.53 micrometer.

Surface area of the pigment: 16.8 m²/g as determined by BET analysis.

The Delamination Index case was 30.

Note that this product does not meet the particle size distribution characteristics of this invention although it did have the ideal Delamination Index.

EXAMPLE 6B

The delaminated product was diluted to 25% solids and nearly all the fines were removed using a centrifuge. The characteristics of the product are:

80.2 wt % finer than 2 micrometer
54.3 wt % finer than 1 micrometer
13.9 wt % finer than 0.5 micrometer
0 wt % finer than 0.3 micrometer
0 wt % finer than 0.2 micrometer
Average particle size 0.90 micrometer This material was delaminated once again to 85% finer than 2 micrometer. The characteristics of the product are:

85 wt % finer than 2 micrometer
61 wt % finer than 1 micrometer
19 wt % finer than 0.5 micrometer
4 wt % finer than 0.3 micrometer
0 wt % finer than 0.2 micrometer
Average particle size 0.80 micrometer Surface area of the pigment: 11.3 m²/g as determined by BET analysis.

Surface area of the pigment: 11.0 m²/g as determined by Mercury porosimetry.

The ratio surface area by Mercury to BET measurement was 0.97.

EXAMPLE 7

This example is illustrative of practice of the invention by substantially removing primary fines and then delaminating while restricting the generation of the secondary fines.

Degritted crude had the following characteristics 65.2 wt % finer than 2 micrometer
51.1 wt % finer than 1 micrometer
34.0 wt % finer than 0.5 micrometer 20.9 wt % finer than 0.3 micrometer 12.7 wt % finer than 0.2 micrometer Average particle size 0.95 micrometer.

The degritted crude was passed through a centrifuge to remove the coarse particle fraction. The product had the following characteristics.

75.4 wt % finer than 2 micrometer 60.1 wt % finer than 1 micrometer 41.6 wt % finer than 0.5 micrometer 25.3 wt % finer than 0.3 micrometer 15.4 wt % finer than 0.2 micrometer Average particle size 0.67 micrometer This material was floated to remove the coloring impurity from the clay. The primary fines were removed using a disk nozzle centrifuge. The pigment after removal of the primary fine had the following particle size distribution:

60.9 wt % finer than 2 micrometer 36.1 wt % finer than 1 micrometer 10.2 wt % finer than 0.5 micrometer 0 wt % finer than 0.3 micrometer 0 wt % finer than 0.2 micrometer Average particle size 1.46 micrometer.

This pigment slurry was then delaminated in a standard delaminator to produce delaminated pigment product 89.3% finer than 2 micrometer. The characteristics of the product were:

89.8 wt % finer than 2 micrometer 67.8 wt % finer than 1 micrometer 28.8 wt % finer than 0.5 micrometer 9.5 wt % finer than 0.3 micrometer 4.3 wt % finer than 0.2 micrometer Average particle size 0.71 micrometer.

Surface area of the pigment: 10.5 m$^2$/g as determined by BET analysis.

Surface area of the pigment: 9.8 m$^2$/g as determined by Mercury porosimetry.

The ratio Surface area by Mercury to BET measurement was 0.94.

The Delamination Index was 27.6.

EXAMPLE 8A

A wood free filling study was performed on a 40% softwood/60% hardwood pulp at a basis weight of 50#/3300 ft2 at net mineral contents of 3, 6, 9 and 12%, to illustrate the advantage of removing the primary fines before delamination. Also a commercial delaminated No. 2 pigment (NUFIL 90) was also included. NUFIL 90 filler kaolin has a PSD of 80% finer than 2 micrometers and contains both the primary and secondary fines.

In this Example performance of two pigments with similar particle size distribution but processed with and without the primary fines were compared. Table 2 illustrates that the opacity obtained by using the pigment of Example 5 was slightly better than that of the Example 4 pigment at all the filler levels. On the other hand, the pigment of Example 4B, which is a much narrower particle size distribution as compared to pigment of Example 4 yielded significant higher opacity in paper. It may be concluded that for pigments with similar PSD, the one delaminated with the primary fines performs poorer as compared with the one without the primary fines. Further, the narrower the PSD, the better is the opacifying performance of the pigment.

It can be further seen that the engineered pigments of the invention yield higher opacities as compared to standard No. 2 delaminated pigment.

TABLE 2

PERFORMANCE OF NO. 2 DELAMINATED VERSUS ENGINEERED PIGMENTS

| Net Mineral Content, % | Nufil 90; Opacity, % | Example 4; Opacity, % | Example 5; Opacity, % | Example 4B; Opacity, % |
|---|---|---|---|---|
| 0 | 66.5 | 66.5 | 66.5 | 66.5 |
| 3 | 69.1 | 69.0 | 69.5 | 69.2 |
| 6 | 71.4 | 71.5 | 72.1 | 71.7 |
| 9 | 73.6 | 73.9 | 74.4 | 74.2 |
| 12 | 75.5 | 76.1 | 76.5 | 76.6 |

EXAMPLE 8B

A wood free filling study on a 30% softwood/70% hardwood pulp at a basis weight of 35#/3300 ft2 and at pigment addition level of 50, 100, 150 lb/ton was performed to compare the opacity of a conventional Number 2 pigment with the engineered pigment of Example 5.

The results show that the engineered pigment of Example 5 performs significantly better than that of Example 3 at all filler levels (Table 3). The pigment of Example 5B yielded higher opacities (from 0.6 points to 1.1 points) as compared to the pigment of Example 5. This result, as in Example 8A, shows an unexpected increase in the opacity with the removal of colloidal fines or by making the particle size distribution narrower.

TABLE 3

COMPARISON OF A NUMBER 2 PIGMENT WITH AN ENGINEERED PIGMENT

| Fill Level, % | Example 3; Opacity, % | Example 5; Opacity, % | Example 5B; Opacity, % |
|---|---|---|---|
| 0 | 71.6 | 71.6 | 71.6 |
| 2.5 | 72.5 | 72.9 | 73.5 |
| 5.0 | 73.7 | 74.2 | 75.1 |
| 7.5 | 75.3 | 75.5 | 76.6 |

EXAMPLE 8C

A wood free filling study was performed on a 40% softwood/60% hardwood pulp at a basis weight of 50#/3300 ft2 at net mineral contents of 4%, 8% and 12%. The pigments compared were samples of Example 4 and Example 6.

The results in Table 4 show that the pigments of Example 4 and Example 6 yield similar opacity, in spite of the fact that there was a significant difference between the particle size. The pigment of Example 6 has a broader particle size distribution and a higher Delamination Index as compared to the pigment of Example 4. It may be concluded from the previous Examples that a pigment similar to that of Example 6 with all the primary fines removed would perform even better.

TABLE 4

COMPARISON OF SHEET OPACITY USING PIGMENTS OF EXAMPLE 4 AND EXAMPLE 6 AS FILLER

| Net Mineral Content, % | Example 4; Opacity, % | Example 6; Opacity, % |
| --- | --- | --- |
| 0 | 77.1 | 77.1 |
| 4 | 79.5 | 79.5 |
| 8 | 81.5 | 81.6 |
| 12 | 83.2 | 83.4 |

EXAMPLE 9

A wood free filling study was performed on a 20% softwood/80% hardwood pulp at a basis weight of 50#/3300 ft2 at an ash content of 7.5, 10.5 and 13.5%. The pigment of Example 7, which is made according to this invention, was compared with the pigment from Example 6.

The results show that the engineered pigment of Example 7 perform significantly better than that of Example 6 at all the filler levels or ash contents.

TABLE 5

COMPARISON OF SHEET OPACITY BY PIGMENTS OF EXAMPLE 6 AND EXAMPLE 7

| % Ash Content | Example 6 Opacity, % | Example 7 Opacity, % |
| --- | --- | --- |
| 0 | | |
| 7.5 | 84.6 | 85.1 |
| 10.5 | 85.6 | 86.2 |
| 13.5 | 86.7 | 87.4 |

EXAMPLE 9B

This example illustrates the benefit of using a pigment of the invention with a paper having a much lower basis weight than the paper used in Example 9A.

A wood free filling study was performed on a 20% softwood/80% hardwood pulp at a basis weight of 34.5#/3300 ft$^2$ at ash contents of 3.7, 5.7, 6.7 and 11.7%. The pigment of Example 7, which is made according to this invention was compared with the pigment from Example 6.

The results show that the engineered pigment of Example 7 perform significantly better than that of Example 6 at all the filler levels or ash contents.

TABLE 6

COMPARISON OF OPACITY BY PIGMENTS OF EXAMPLE 6 AND EXAMPLE 7 IN A LOW BASIS WEIGHT SHEET

| % Ash Content | Example 6 Opacity, % | Example 7 Opacity, % |
| --- | --- | --- |
| 3.7 | 71.8 | 72.8 |
| 5.7 | 73.1 | 74.2 |
| 6.7 | 73.7 | 75.0 |
| 8.7 | 75.1 | 76.4 |

Some important conclusions from the examples are:
1. Removal of primary fines improves the opacifying powers of a pigment
2. The narrower the particle size distribution, the higher is the opacifying powers of the pigment
3. Removal of primary fines yield better delamination rates

We claim:

1. A delaminated kaolin pigment in form of thin platelet particles derived from kaolin stacks and consisting essentially of thin platelet particles which are at least 85% by weight finer than 2 micrometers, e.s.d., 50% by weight in the range of 0.65 micrometers to 1.20 micrometers, 25% by weight or less finer than 0.5 micron, 10% by weight or less finer than 0.3 micrometers, and 5% by weight or less finer than 0.2 microns, said particles having a BET surface area in the range of 7 to 12 m$^2$/g and a ratio of surface area as measured by Mercury porosimetry to surface area as measured by BET in the range of 0.6 to 0.95, said pigment having a Delamination Index in the range of 20 to 45.

2. The pigment in claim 1 which has a GE brightness in the range of 80–95%.

3. The pigment in claim 1 which the Delamination Index is in the range of 25–35.

4. The pigment of claim 3 wherein the said Index is 30.

5. The pigment of claim 1 wherein about 85% by weight of particles are finer than 2 micrometers e.s.d.

6. The pigment of claim 1 wherein 15% to 25% by weight of the particles are finer that 0.5 micrometers and zero % by weight are finer than 0.2 micrometers.

7. A process for mechanically delaminating a source of kaolin stacks to produce thin platelet particles useful as a filler for paper, the improvement which comprises removing particles smaller than 0.2 micrometers before mechanically delaminating said source of stacks and controlling the particles size distribution to recover a delaminated kaolin product which is at least 85% finer than 2 micrometers, e.s.d., 50% by weight in the range of 0.55 micrometers to 0.90 micrometers, less than 10% by weight finer than 0.3 micrometers and 5% by weight or less of particles finer than 0.2 microns, said particles having a BET surface area in the range of 7–12 m$^2$/g, a ratio of surface area as measured by Mercury porosimetry to surface area as measured by BET is in the range of 0.6–0.95 and a Delamination Index in the range of 25–40.

* * * * *